(12) United States Patent
Park et al.

(10) Patent No.: US 10,439,261 B2
(45) Date of Patent: Oct. 8, 2019

(54) METAL-AIR BATTERY

(71) Applicant: SAMSUNG ELECTRONICS CO., LTD., Gyeonggi-do (KR)

(72) Inventors: Jungock Park, Gyeonggi-do (KR); Kyounghwan Choi, Gyeonggi-do (KR); Joonhee Kim, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 122 days.

(21) Appl. No.: 14/969,027

(22) Filed: Dec. 15, 2015

(65) Prior Publication Data

US 2017/0170534 A1 Jun. 15, 2017
US 2018/0076495 A9 Mar. 15, 2018

(30) Foreign Application Priority Data

Jun. 18, 2015 (KR) .................. 10-2015-0086607

(51) Int. Cl.
*H01M 12/02* (2006.01)
*H01M 12/08* (2006.01)
*H01M 4/02* (2006.01)

(52) U.S. Cl.
CPC ........... *H01M 12/08* (2013.01); *H01M 12/02* (2013.01); *H01M 2004/025* (2013.01); *Y02E 60/128* (2013.01)

(58) Field of Classification Search
None
See application file for complete search history.

(56) References Cited

U.S. PATENT DOCUMENTS

| 6,617,074 B1* | 9/2003 | Watarai | H01M 2/18 429/127 |
| 7,150,768 B2 | 12/2006 | Airey et al. | |
| 8,871,394 B1 | 10/2014 | Garcia et al. | |
| 8,895,197 B2 | 11/2014 | Friesen et al. | |
| 2001/0008726 A1* | 7/2001 | Murai | H01M 2/08 429/212 |
| 2005/0058888 A1* | 3/2005 | Aamodt | H01M 2/16 429/94 |
| 2006/0105233 A1* | 5/2006 | Morita | H01M 2/021 429/162 |
| 2010/0285375 A1 | 11/2010 | Friesen et al. | |
| 2015/0140452 A1 | 5/2015 | Park et al. | |
| 2016/0204437 A1* | 7/2016 | Tajima | H01M 4/62 429/94 |

FOREIGN PATENT DOCUMENTS

KR 100765966 B1 12/2006

* cited by examiner

*Primary Examiner* — Haroon S. Sheikh
(74) *Attorney, Agent, or Firm* — Cantor Colburn LLP

(57) ABSTRACT

A metal-air battery includes a gas diffusion layer; a first cathode and a second cathode disposed on opposite surfaces of the gas diffusion layer, respectively; an ion conducting membrane, including a folded portion, surrounding the first cathode, the gas diffusion layer, and the second cathode and disposed on each of the first cathode and the second cathode; and an anode, including a folded portion, surrounding the ion conducting membrane and disposed on the ion conducting membrane, where the folded portion of the anode is folded in a same direction as the folded portion of the ion conducting membrane.

20 Claims, 14 Drawing Sheets

METAL-AIR BATTERY

CROSS-REFERENCE TO RELATED APPLICATION

This application claims priority to Korean Patent Application No. 10-2015-0086607, filed on Jun. 18, 2015, and all the benefits accruing therefrom under 35 U.S.C. § 119, the content of which in its entirety is herein incorporated by reference.

BACKGROUND

1. Field

The disclosure relates to metal-air batteries.

2. Description of the Related Art

A metal-air battery typically includes an anode that allows deposition/dissolution of metal ions, a cathode for oxidizing/reducing oxygen in the air, and a metal-ion conducting medium disposed between the cathode and the anode.

The metal-air battery may use a metal itself as the anode and may have a high capacity because the metal-air battery does not need to store air used as a cathode active material. The metal-air battery may have a high theoretical energy density per unit weight of about 3500 watt-hour per kilogram (W·h/kg) or greater.

To improve the energy density of a metal-air battery, in general, a membrane-electrode assembly including a stack of a cathode, an electrolyte membrane and an anode is folded multiple times and accommodated in a battery case.

SUMMARY

In such a metal-air battery described above, the membrane-electrode assembly may be damaged due to a crack in the electrolyte membrane in a folded portion of the membrane-electrode assembly, which may cause air crossover or a short, and thus, the metal-air battery may not normally operate.

Therefore, a metal-air battery is described to have a structure to prevent a crack in the folded portion of the membrane-electrode assembly.

Embodiments of the invention relate to a metal-air battery having a structure to prevent a crack in a folded portion of the metal-air battery.

According to an exemplary embodiment, a metal-air battery includes: a gas diffusion layer; a first cathode and a second cathode disposed on opposite surfaces of the gas diffusion layer, respectively; an ion conducting membrane, including a folded portion, surrounding the first cathode, the gas diffusion layer, and the second cathode and disposed on each of the first cathode and the second cathode; and an anode, including a folded portion, surrounding the ion conducting membrane and disposed on the ion conducting membrane. In such an embodiment, the folded portion of the anode is folded in a same direction as the folded portion of the ion conducting membrane. According to another exemplary embodiment, a metal-air membrane includes: a gas diffusion layer; a cathode, including a folded portion, surrounding the gas diffusion layer and disposed on opposite surfaces of the gas diffusion layer; an ion conducting membrane, including a folded portion, surrounding the cathode and disposed on opposite surfaces of the cathode, where the folded portion of the ion conducting membrane being folded in a same direction as the folded portion of the cathode; an anode, including a folded portion, surrounding the ion conducting membrane and disposed on opposite surfaces of the ion conducting membrane, where the folded portion of the anode is folded in the same direction as the folded portion of the ion conducting membrane; and an interlayer including a reinforcing agent and disposed to contact the folded portion of the ion conducting membrane.

According to another exemplary embodiment, a metal-air battery includes: a gas diffusion layer; a cathode, including a folded portion, surrounding the gas diffusion layer and disposed on opposite surfaces of the gas diffusion layer; an ion conducting membrane, including a folded portion, surrounding the cathode and disposed on opposite surfaces of the cathode, where the folded portion of the ion conducting membrane is folded in a same direction as the folded portion of the cathode; a first anode and a second anode disposed on opposite surfaces of the gas diffusion layer, respectively; and an anode current collector, including a folded portion, surrounding the first anode, the ion conducting membrane and the second anode, and disposed on surfaces of the first anode and the second anode.

BRIEF DESCRIPTION OF THE DRAWINGS

These and/or other features of embodiments of the invention will become apparent and more readily appreciated from the following description of the exemplary embodiments, taken in conjunction with the accompanying drawings, in which.

DETAILED DESCRIPTION

Figure 1A:
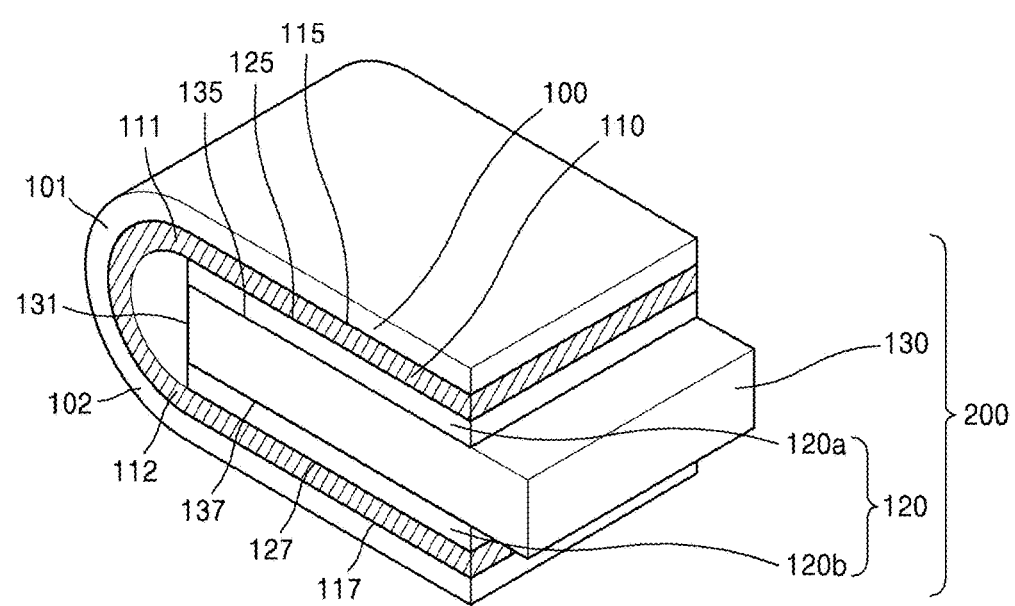
FIGS. 1A to 1D are schematic views illustrating structures of embodiments of a metal-air battery, according to the invention.

Reference will now be made in detail to exemplary embodiments of a metal-air battery and a metal-air battery module, examples of which are illustrated in the accompanying drawings, in which like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a metal-air battery includes: a gas diffusion layer; a first cathode disposed on opposite a first surface of the gas diffusion layer; a second cathode disposed on a second surface of the gas diffusion layer, which is opposite to the first surface; an ion conducting membrane including a folded portion and surrounding the first cathode, the gas diffusion layer and the second cathode, and disposed on outer surfaces of the first cathode and the second cathode, respectively; and an anode including a folded portion, surrounding the ion conducting membrane and disposed on the ion conducting membrane. In such an embodiment, the folded portion of the anode is folded in the same direction as the folded portion of the ion conducting membrane.

In an embodiment of the metal-air battery, the first cathode and second cathode are separated from one another and not contacting with the folded portion of the ion conducting layer, which is at a folded portion of the metal-air battery, such that stress on the folded portion of the ion conducting membrane may be reduced to prevent cracking of the ion conducting membrane. In such an embodiment, the cathode does not contact with the folded portion of the ion conducting membrane, such that a short between the cathode and the anode may be effectively prevented even when a crack occurs in the folded portion of the ion conducting membrane. As a result, the metal-air battery may have improved stability, and deterioration thereof may be effectively prevented.

Hereinafter, embodiments of the invention will be described in detail with reference to the accompanying drawings.

FIGS. 1A to 1D are schematic views illustrating structures of embodiments of a metal-air battery, according to the invention.

Referring to FIG. 1A, an exemplary embodiment of a metal-air battery 200 includes: a gas diffusion layer 130; a first cathode 120a disposed on a first surface 135 (e.g., an upper surface) of the gas diffusion layer 130; a second cathode 120b disposed on a second surface 137 (e.g., a lower surface) of the gas diffusion layer 130, which is opposite to the first surface 135; an ion conducting membrane 110 including a folded portion 111, 112, disposed around, e.g., surrounding, the first cathode 120a, the gas diffusion layer 130 and the second cathode 120b to contact outer surfaces 125 and 127 of the first cathode 120a and the second cathode 120b, respectively; and an anode 100 including a folded portion 101, 102, disposed around, e.g., surrounding, the ion conducting membrane 110 to contact surfaces 115 and 117 of the ion conducting membrane 110. In such an embodiment, the folded portion 101, 102 of the anode 100 is folded in the same direction as that of the folded portion 111, 112 of the ion conducting membrane 110.

In such an embodiment, the first cathode 120a and the second cathode 120b are not disposed on a side 131 of the gas diffusion layer 130, such that stress on the ion conducting membrane 110 at the folded portion 111, 112 may be reduced, and a short between the anode 110 and the cathode 120 due to a crack of the ion conducting membrane 110 may be effectively prevented.

Figure 1B:
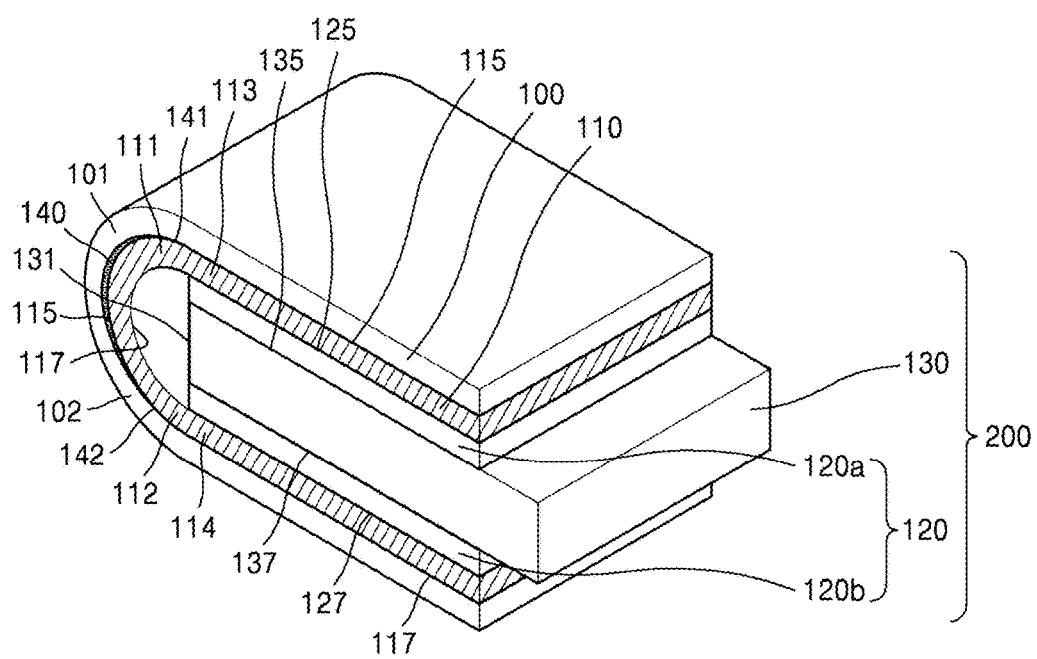

Referring to FIG. 1B, an alternative embodiment of the metal-air battery 200 may further include an interlayer 140 that includes a reinforcing agent and contacts the folded portion 111, 112 of the ion conducting membrane 110. In such an embodiment, a crack in the at least one folded portion 111, 112 of the ion conducting membrane 110 may be prevented by the interlayer 140 including the reinforcing agent.

In an embodiment, the interlayer 140 may be defined by a coating layer on the ion conducting membrane 110. In such an embodiment, the interlayer 140 may be formed by coating a reinforcing agent on the ion conducting membrane 110. The coating may be performed using any coating method available in the art, for example, bar coating or spin coating. In some embodiments, a separate film may be simply stacked on the ion conducting membrane 110 as the interlayer 140.

The interlayer 140 may be folded in the same direction as that of the folded portion 111, 112 of the ion conducting membrane 110, and end portions 141 and 142 of the interlayer 140 may extend to a non-folded portion 113 or 114 (e.g., a flat portion) of the ion conducting membrane 110. In one embodiment, for example, the end portions 141 and 142 of the interlayer 140 may extend near to a boundary between the folded portion 111, 112 and a non-folded portion 113 or 114 of the ion conducting membrane 110. Thus, the interlayer 140 may be completely coated on the folded portions 111 and 112 of the ion conducting membrane 110. In an embodiment, as shown in FIGS. 1A to 1D, the folded portion 111, 112 of the ion conducting membrane 110 refer to the whole folded region of the ion conducting membrane 110 that does not contact the first cathode 120a and the second cathode 120 of the ion conducting membrane 110. In such an embodiment, as shown in FIGS. 1A to 1D, the non-folded portion 113 or 114 of the ion conducting membrane 110 refer to a non-folded region of the ion conducting membrane 110 that contacts the first cathode 120a and the second cathode 120b. The folded portions 101 and 102 of the anode 100 may have about the same curvature as the folded portion 111, 112 of the ion conducting membrane 110.

In such an embodiment, where the folded portions 111 and 112 of the ion conducting membrane 110 is completely coated with the interlayer 140, the reinforcing agent in the interlayer 104 may effectively prevent cracking in the ion conducting membrane 110.

In one embodiment, for example, referring to FIG. 1B, in the metal-air battery 200, the interlayer 140 may be disposed between the folded portions 111 and 112 of the ion conducting membrane 110 and the folded portions 101 and 102 of the anode 100. The interlayer 140 may effectively prevent a short between the anode 100 and the cathode 120 even when a crack occurs in the ion conducting membrane 110 by being disposed between the folded portions 111 and 112 of the ion conducting membrane 110 and the folded portions 101 and 102 of the anode 100.

Figure 1C:
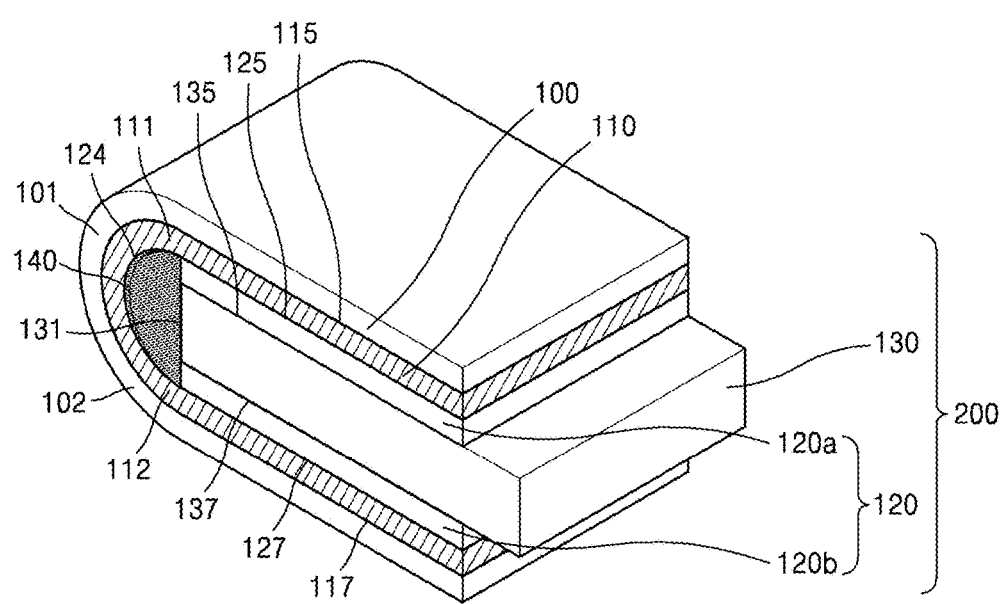

In another alternative embodiment, referring to FIG. 1C, in the metal-air battery 200, the interlayer 140 may be disposed on an inner surface 124 of the folded portions 111 and 112 of the ion conducting membrane 110 facing the cathode 120. The interlayer 140 may effectively prevent a short between the anode 100 and the cathode 120 or the gas diffusion layer 130 even when a crack occurs in the ion conducting membrane 110 by being disposed on the inner surface 124 of the folded portions 111 and 112 of the ion conducting membrane 110 facing the cathode 120.

Figure 1D:
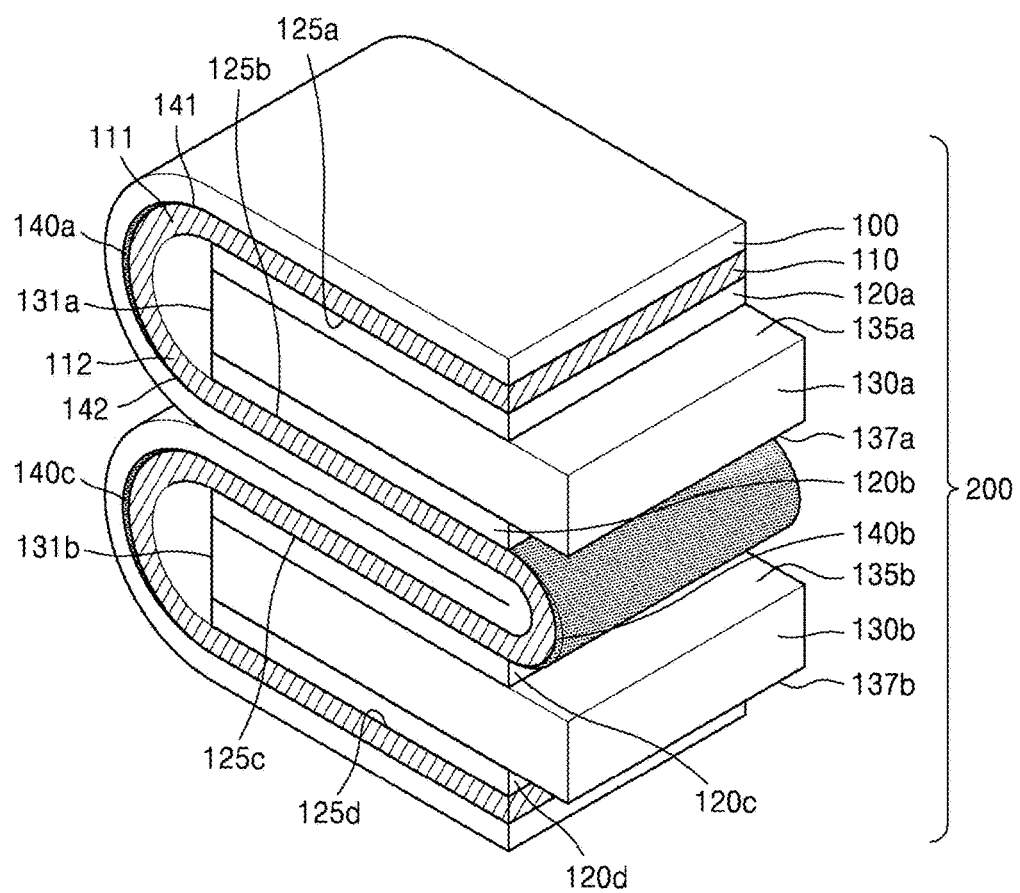

In some embodiments, as shown in FIG. 1D, the metal-air battery 200 may be implemented as a 3-dimensional ("3D") metal-air battery 200 obtained by folding the metal-air battery 200 multiple times in a thickness direction of the metal-air battery 200, e.g., a stacking direction of the elements of the metal-air battery 200.

Referring to FIG. 1D, an embodiment of the 3D metal-air battery 200 may include a plurality of gas diffusion layers 130a and 130b spaced apart from one another in a thickness direction of the 3D metal-air battery 200. The 3D metal-air battery 200 may include a plurality of first cathodes 120a and 120c and a plurality of second cathodes 120b and 120d. In such an embodiment, a first cathode 120a and a second cathode 120b are disposed on opposite surfaces 135a and 137a (e.g., upper and lower surfaces) of a corresponding gas diffusion layer 130a, respectively, and another first cathode 120c and another second cathode 120d are disposed on opposite surfaces 135b and 137b of a corresponding gas diffusion layer 130b, respectively. The ion conducting membrane 110 may be repeatedly folded by about 180°, e.g., in a serpentine pattern, to allow a first surface thereof to contact respective outer surfaces 125a, 125b, 125c and 125d of the first cathodes 120a and 120c, and the second cathodes 120b and 120d. The anode 100 may be repeatedly folded by about 180°, e.g., in a serpentine pattern similarly to the ion conducting membrane 110, to allow to contact a second surface of the ion conducting membrane 110, which is opposite to the first surface of the ion conducting membrane 110. The anode 100 may include a portion folded by about 180° and disposed between two adjacent gas diffusion layers 130a and 130b. The ion conducting membrane 110 may include a portion folded by about 180° and disposed between the two adjacent gas diffusion layers 130a and 130b. The folded portion of the ion conducting membrane 110 between the two adjacent gas diffusion layers 130a and 130b may be disposed on an outer surface of the folded portion of the anode 100 between the two adjacent gas diffusion layers 130a and 130b.

In such an embodiment of the 3D metal-air battery 200, the first cathodes 120a and 120c and the second cathodes 120b and 120d are not disposed on sides 131a and 131b of the gas diffusion layers 130a and 130b, such that a short between the anode 100 and the first cathode 120a, 120c and the second cathode 120b, 120d may be effectively prevented.

In such an embodiment, the 3D metal-air battery 200 may include a plurality of interlayers 140a, 140b and 140c including a reinforcing agent that contacts all of the folded portions 111 and 112 of the ion conducting membrane 110. In such an embodiment of 3D metal-air battery 200, a crack in the ion conducting membrane 110 and a short between the anode 100, and the first and second cathodes 120a, 120b, 120c and 120d may be prevented by the plurality of interlayers 140a, 140b and 140c.

In an embodiment of the metal-air battery 200 shown in FIG. 1B, the interlayer 140 may have a thickness in a range of about 5 μm to about 500 μm. However, the thickness of the interlayer 140 is not limited thereto, and may be appropriately adjusted. In one embodiment, for example, the interlayer 140 of the metal-air battery 200 may have a thickness in a range of about 5 μm to about 50 μm, and in an alternative embodiment, about 50 μm to about 100 μm, and in some other embodiments, the interlayer 140 may have a thickness in a range of about 100 μm to about 500 μm. When the thickness of the interlayer 140 is within these ranges, a crack in the ion conducting membrane 110 may be effectively prevented. The thickness of the interlayer 140 may be defined as a thickness of the thickest portion of the interlayer 140.

In such an embodiment of the metal-air battery 200 shown in FIG. 1B, a width between the end portions 141 and 142 of the interlayer 140 (hereinafter, referred to also as "width of the interlayer 140") may be in a range of about 10 micrometers (μm) to about 1000 μm. However, the width between the end portions 141 and 142 of the interlayer 140 is not limited thereto, and may be appropriately adjusted. In one embodiment, for example, the interlayer 140 of the metal-air battery 200 may have a width in a range of about 10 μm to about 100 μm, and in an alternative embodiment, the interlayer 140 may have a width in a range of about 100 μm to about 500 μm. In another alternative embodiment, the interlayer 140 may have a width in a range of about 500 μm to about 1000 μm. When the width of the interlayer 140 is within these ranges, a crack in the ion conducting membrane 110 may be effectively prevented. The width between the end portions 141 and 142 of the interlayer 140 refers to the distance between the end portions 141 and 142 before folding.

In an embodiment of the metal-air battery 200, e.g., the embodiment shown in FIG. 1B, the reinforcing agent in the interlayer 140 may include an elastic polymer. In such an embodiment, where a polymer used as the reinforcing agent has elasticity, the interlayer 140 may prevent a crack in folded portions of an ion conducting membrane and an anode that are stacked upon one another in a metal-air battery and may effectively accommodate the anode 100 and the cathode 120, volumes of which change during charging and discharging.

The reinforcing agent may be a sealant. In one embodiment, for example, the reinforcing agent may be a silicon-based sealant, an acrylic sealant, an epoxy-based sealant, a polyurethane-based sealant, or a polysulfide-based sealant, but is not limited thereto. Any sealant available as a reinforcing agent in the art may be used. The types of the sealant and a method of using the sealant are not particularly limited. In one embodiment, for example, the sealant may be a one-component sealant, a two-component sealant, a solution state sealant, or a slurry state sealant. Referring to FIG. 1B, in an embodiment, the interlayer 140 may be formed by coating a sealant on one of the opposite surfaces 115 and 117 of the ion conducting membrane 110.

In one embodiment, for example, the reinforcing agent may include at least one selected from a polysiloxane resin, a phenoxy resin, a polyester resin, a polyurethane resin, a polyimide resin, a polysulfide resin, a siloxane-modified polyimide resin, polybutadiene, polypropylene, an isobutylene-isoprene copolymer, a styrene-butadiene-styrene copolymer, a styrene-ethylene-butylene-styrene copolymer, a polyacetal resin, a polyvinyl butyral resin, a polyvinyl acetal resin, polyamide resin, an acrylonitrile-butadiene copolymer, an acrylonitrile-butadiene-acrylic acid copolymer, an acrylonitrile-butadiene-styrene copolymer, polyvinyl acetate, nylon, a (meth)acrylic resin, (meth)acrylic rubber, an urethane (meth)acrylate copolymer, an acryl copolymer, and a modified polymer thereof, but is not limited thereto. Any polymer available as a reinforcing agent in the art may be used.

In some embodiments, the ion conducting membrane 110 in the metal-air battery 200 may be a gas and moisture barrier membrane. In one embodiment, for example, the ion conducting membrane 110 may be an oxygen barrier membrane. Thus, in such an embodiment, the ion conducting membrane 110 may have active metal ion conductivity and an oxygen barrier function.

Figure 2A:
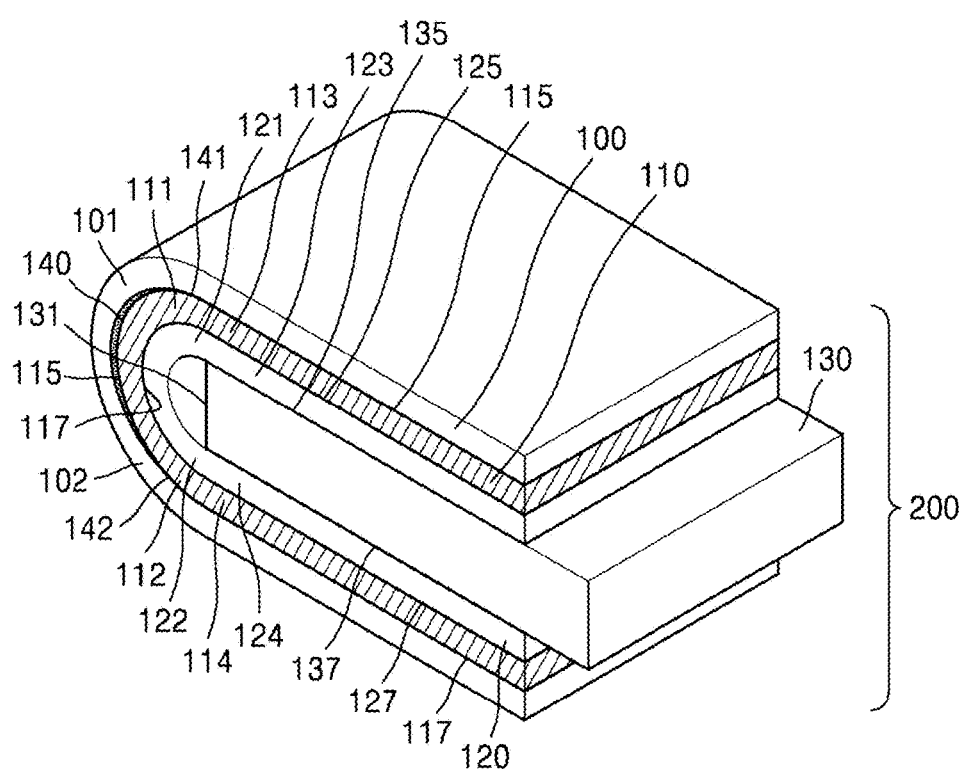
FIGS. 2A to 2C are schematic views illustrating structures of alternative embodiments of a metal-air battery, according to the invention.
Figure 2B:
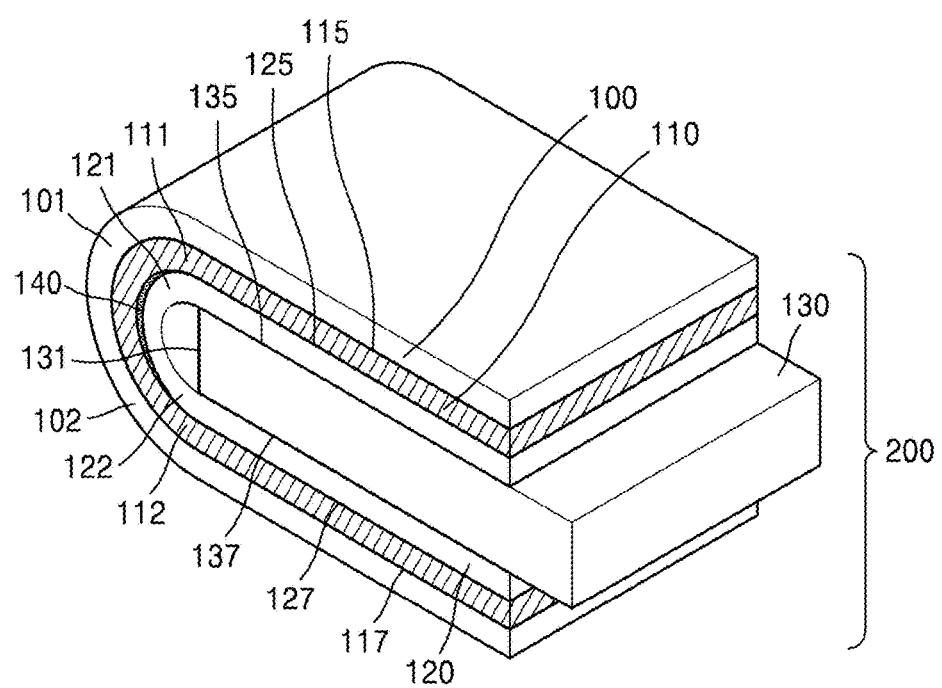
Figure 2C:
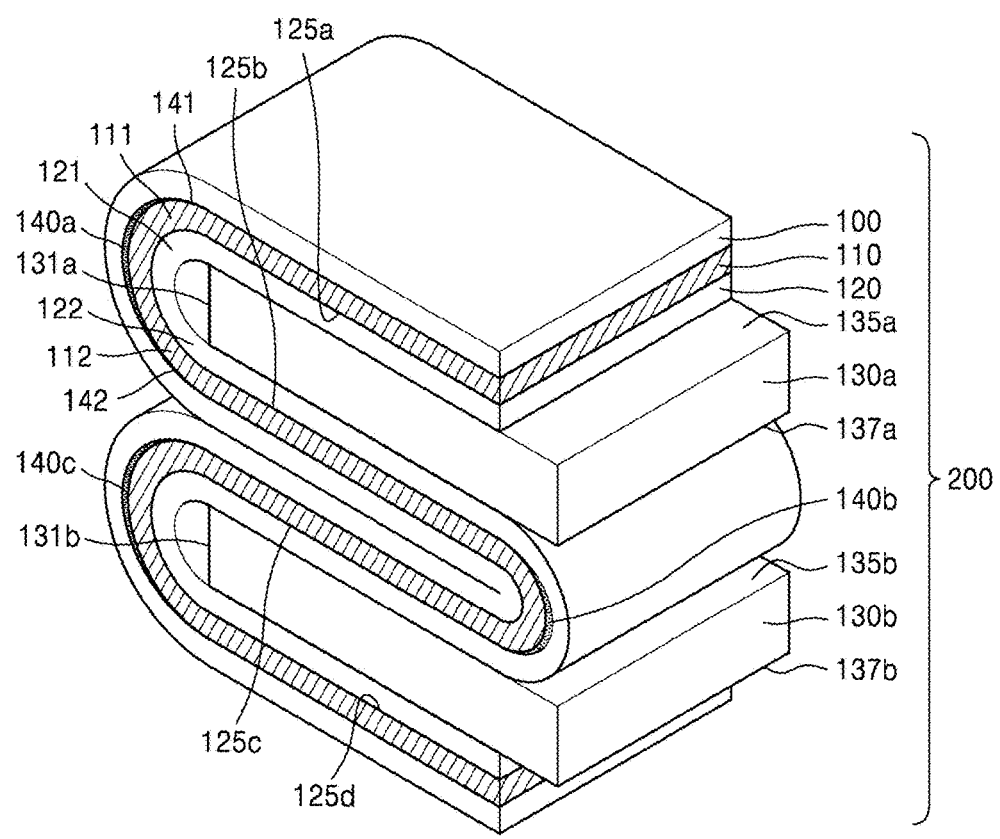

FIGS. 2A to 2C are schematic views illustrating structures of alternative embodiments of a metal-air battery, according to the invention.

Referring to FIG. 2A, an alternative embodiment of a metal-air battery 200 may include: a gas diffusion layer 130; a cathode 120 including a folded portion 121, 122, and disposed around, e.g., surrounding, the gas diffusion layer 130 to contact opposite surfaces 135 and 137 (e.g., upper and lower surfaces) of the gas diffusion layer 130; an ion conducting membrane 110 including a folded portion 111, 112 and disposed around, e.g., surrounding, the cathode 120 to contact opposite surfaces 125 and 127 (e.g., opposing outer surfaces) of the cathode 120; an anode 100 including a folded portion 101, 102 and disposed around the ion conducting membrane 110 to contact opposite surfaces 115 and 117 (e.g., opposing outer surfaces) of the ion conducting membrane 110; and an interlayer 140 including a reinforcing agent that contacts the folded portion 111, 112 of the ion conducting membrane 110. In such an embodiment, the folded portion 111, 112 of the ion conducting membrane 110 is folded in the same direction as that of the cathode 120, and the folded portion 101, 102 of the anode 100 is folded in the same direction as that of the ion conducting membrane 110

In such an embodiment, the interlayer 140 including a reinforcing agent that contacts the at least one folded portion 111, 112 of the ion conducting membrane 110 may effectively prevent a crack in the folded portion 111, 112 of the ion conducting membrane 110, and a short between the anode 110 and the cathode 120, when cracking occurs in the ion conducting membrane 110.

The interlayer 140 may be folded in the same direction as the at least one folded portion 111, 112 of the ion conducting membrane 110, and end portions 141 and 142 of the interlayer 140 may extend to non-folded portions 113 and 114 of the ion conducting membrane 110. By completely coating the folded portions 111, 112 of the ion conducting membrane 110 with the interlayer 140, the reinforcing agent in the interlayer 104 may effectively prevent cracking in the ion conducting membrane 110.

In an embodiment, as shown in FIGS. 2A to 2C, the folded portions 121 and 122 of the cathode 120 may refer to a region of the cathode 120 that is folded and does not contact the gas diffusion layer 130. In an embodiment, as shown in FIGS. 2A to 2C, non-folded portions 123 and 124 of the cathode 120 may refer to a region of the cathode 120 that is not folded and contacts the gas diffusion layer 130. The folded portions 111 and 112 of the ion conducting membrane 110 and the folded portions 101 and 102 of the anode 100 may have about a same curvature as the folded portions 121 and 122 of the cathode 120.

In one embodiment, for example, referring to FIG. 2A, in the metal-air battery 200, the interlayer 140 may be disposed between the folded portions 111 and 112 of the ion conducting membrane 110 and the folded portions 101 and 102 of the anode 100. The interlayer 140 may prevent a short between the anode 100 and the cathode 120 even when a crack occurs in the ion conducting membrane 110 by being disposed between the folded portions 111 and 112 of the ion conducting membrane 110 and the folded portions 101 and 102 of the anode 100.

In some embodiments, referring to FIG. 2B, in the metal-air battery 200, the interlayer 140 may be disposed between the folded portions 111 and 112 of the ion conducting membrane 110 and the folded portions 121 and 122 of the cathode 120. The interlayer 140 may prevent a short between the anode 100 and the cathode 120 even when a crack occurs in the ion conducting membrane 110 by being disposed between the folded portions 111 and 112 of the ion conducting membrane 110 and the folded portions 121 and 122 of the cathode 120.

In some embodiments, as shown in FIG. 2C, the metal-air battery 200 may be implemented as a 3D metal-air battery 200 obtained by folding the metal-air battery 200 multiple times in a thickness direction of the metal-air battery 200.

Referring to FIG. 2C, an embodiment of the 3D metal-air battery 200 may include a plurality of gas diffusion layers 130a and 130b spaced apart from one another in a thickness direction of the 3D metal-air battery 200; a cathode 120 disposed and repeatedly folded by about 180°, e.g., in a serpentine pattern, to contact opposite surfaces 135a and 137a of the gas diffusion layer 130a and opposite surfaces 136b and 137b of the gas diffusion layer 130b; an ion conducting membrane 110 disposed and repeatedly folded by about 180°, e.g., in the same serpentine pattern, as the cathode 120 to contact the cathode 120; and an anode 100 disposed and repeatedly folded by about 180°, e.g., in the same serpentine pattern, as the ion conducting membrane 110 to contact the ion conducting membrane 110. In such an embodiment, the anode 100 may be folded by about 180° and overlap between two adjacent gas diffusion layers 130a and 130b.

An embodiment of the 3D metal-air battery 200, as shown in FIG. 2C, may include a plurality of interlayers 140a, 140b and 140c including a reinforcing agent that contacts all the folded portions 111 and 112 of the ion conducting member 110. The interlayers 140a, 140b, and 140c of the 3D metal-air battery 200 may prevent a crack in the ion conducting membrane 110 and a short between the anode 100 and the cathode 120 by the inclusion of the plurality of interlayers 140a, 140b and 140c.

Figure 3A:
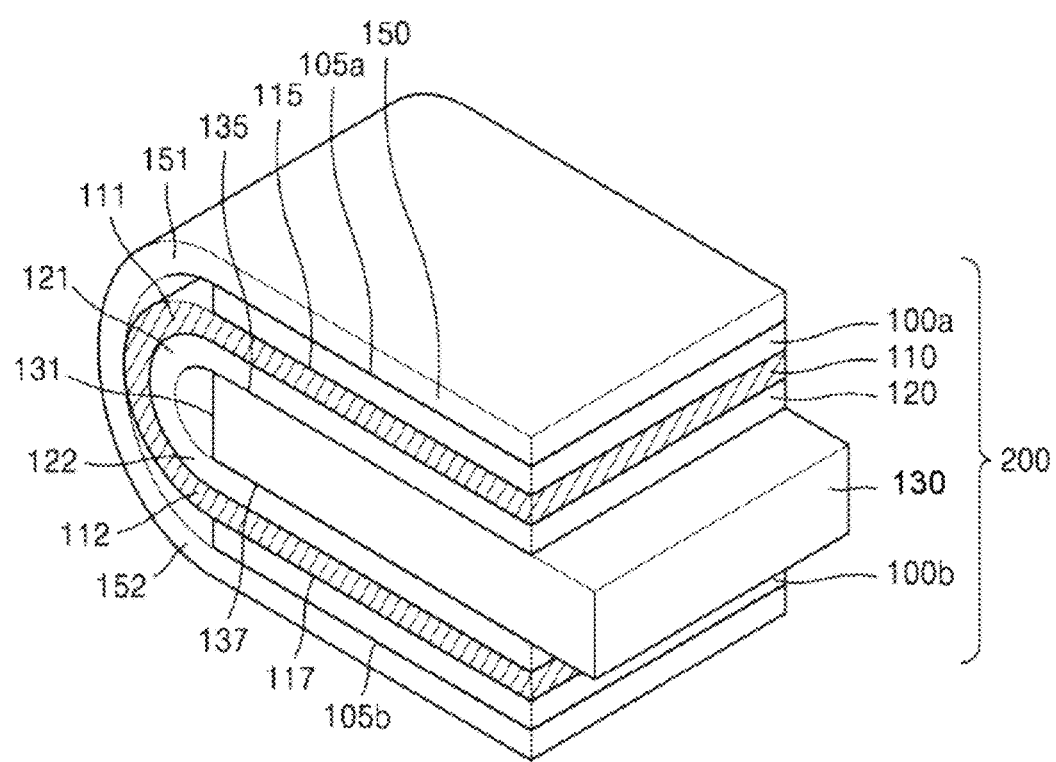
FIGS. 3A to 3C are schematic views illustrating structures of other alternative embodiments of a metal-air battery, according to the invention.
Figure 3B:
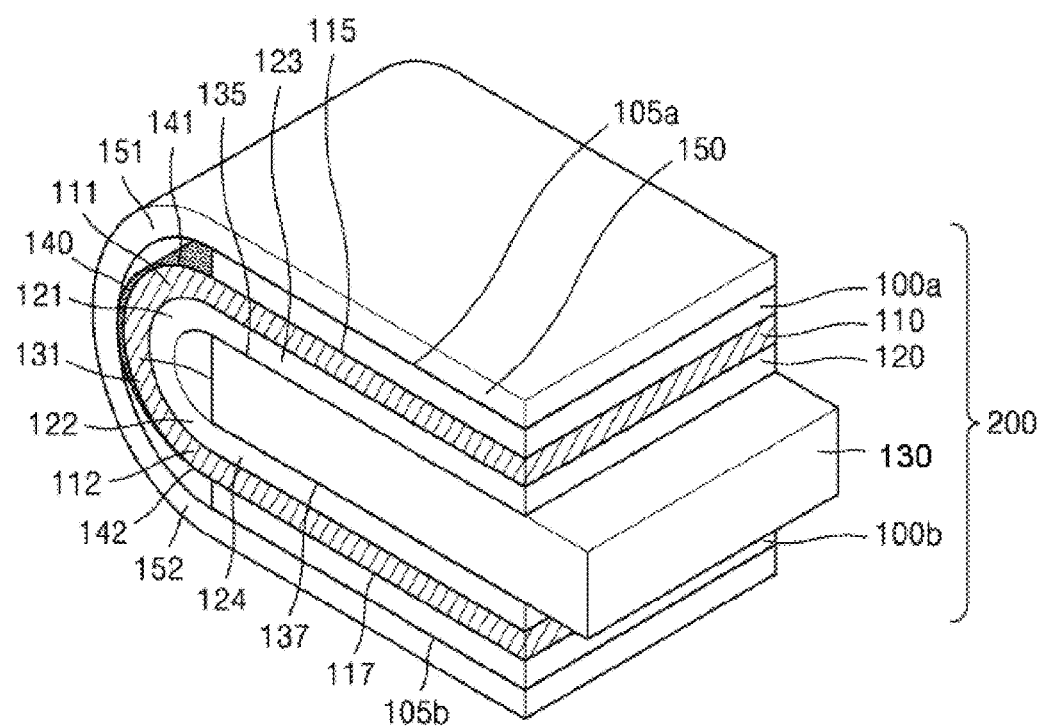
Figure 3C:
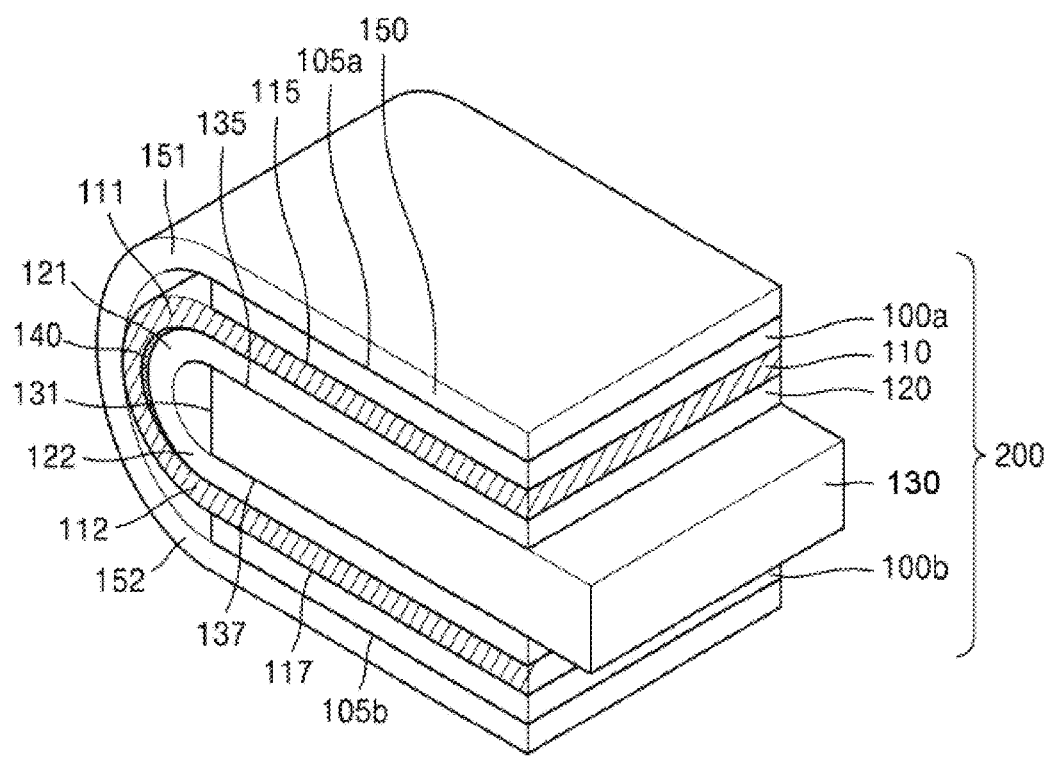

FIGS. 3A to 3C are schematic views illustrating structures of other alternate alternative embodiments of a metal-air battery, according to the invention.

Referring to FIG. 3A, an alternative embodiment of a metal-air battery 200 may include: a gas diffusion layer 130; a cathode 120 including a folded portion 121, 122, and disposed around, e.g., surrounding, the gas diffusion layer 130 to contact opposite surfaces 135 and 137 of the gas diffusion layer 130; an ion conducting membrane 110 including a folded portion 121, 122 that is folded in the same direction as that of the cathode 120 and disposed around, e.g., surrounding, the cathode 120; a first anode 100a disposed on a surface 115 of the ion conducting membrane 110; a second anode 100b disposed on a surface 117 of the ion conducting membrane 110 opposite to the surface 115 on which the first anode 100a is disposed; and an anode current collector 150 including a folded portion 151 (152), disposed around, e.g., surrounding, the first anode 100a, the ion conducting membrane 110 and the second anode 100b to contact a surface 105a of the first anode 100a and a surface 105b of the second anode 100b.

In such an embodiment, the metal-air battery 200 includes the first anode 100a and the second anode 100b that are separated from one another and do not contact the folded portions 111 and 112 of the ion conducting membrane 110, stress on the ion conducting membrane 110 at a folded portion of the metal-air battery 200 or the ion conducting membrane 110 may be reduced, and thus suppress cracking in the ion conducting membrane 110. In such an embodiment, the first anode 100a and the second anode 100b do not contact the folded portions 111 and 112 of the ion conducting membrane 110, such that a short between the cathode 120 and the first and second anodes 110a and 100b may be effectively prevented even when a crack occurs in the ion conducting membrane 110. As a result, such an embodiment of the metal-air battery 200 may have improved stability and deterioration thereof may be prevented.

In such an embodiment, the first anode 100a and the second anode 100b are disposed not to contact the folded portions 111 and 112 of the ion conducting membrane 110, such that stress on the folded portions 111 and 112 of the ion conducting membrane 110 may be reduced, and thus to prevent a short between the cathode 120 and the anode 100 when a crack occurs in the ion conducting membrane 110.

In another alternative embodiment, as shown in FIG. 3B, the metal-air battery 200 may further include an interlayer 140 including a reinforcing agent that contacts the folded portion 111 (112) of the ion conducting membrane 110. The inclusion of the reinforcing agent in the interlayer 140 may prevent a crack in the folded portion 111 (112) of the ion conducting membrane 110.

The interlayer 140 may be folded in the same direction as the folding portion 111 (112) of the ion conducting membrane 110, and end portions 141 and 142 of the interlayer 140 may extend to non-folded portions 113 and 114 of the ion conducting membrane 110. In one embodiment, for example, the end portions 141 and 142 of the interlayer 140 may extend to near a boundary between the folded portions 111 and 112 and the non-folded portions 113 and 114 of the ion-conducting member 110. Thus, the interlayer 140 may completely coat the folded portions 111 and 112 of the ion conducting membrane 110.

By completely coating the folded portions 111 and 112 of the ion conducting membrane 110 with the interlayer 140, the reinforcing agent in the interlayer 140 may effectively prevent cracking in the ion conducting membrane 140.

In an embodiment, as shown in FIGS. 3A to 3C, the folded portions 121 and 122 of the cathode 120 refer to the whole folded region of the cathode 120 that does not contact the gas diffusion layer 130. The non-folded portions 123 and 124 of the cathode 120 refer to a non-folded region (e.g., a flat portion) of the cathode 120 that does not contact the gas diffusion layer 130. The folded portions 111 and 112 of the ion conducting membrane 110 and the folded portions 151 and 152 of the anode current collector 150 may have substantially the same curvature as the folded portions 121 and 122 of the cathode 120.

In some embodiments, referring to FIG. 3B, in the metal-air battery 200, the interlayer 140 may be disposed between the folded portions 111 and 112 of the ion conducting membrane 110 and the folded portions 151 and 152 of the anode current collector 150. The interlayer 140 may effectively prevent a short between the cathode 120 and the first anode 100a and the second anode 100b even when a crack occurs in the ion conducting membrane 110 by being disposed between the folded portions 111 and 112 of the ion conducting membrane 110 and the folded portions 151 and 152 of the anode current collector 150.

In some embodiments, referring to FIG. 3C, in the metal-air battery 200, the interlayer 140 may be disposed between the folded portions 111 and 112 of the ion conducting membrane 110 and the folded portions 121 and 122 of the cathode 120. The interlayer 140 may effectively prevent a short between the cathode 120, and the first anode 100a and the second anode 100b even when a crack occurs in the ion conducting membrane 110 by being disposed between the folded portions 111 and 112 of the ion conducting membrane 110 and the folded portions 121 and 122 of the cathode 120.

In some embodiments, the metal-air battery 200 shown in FIGS. 3A to 3C may be implemented as a 3D metal-air battery 200 obtained by folding the metal-air battery 200 multiple times in a thickness direction of the metal-air battery 200. A detailed structure of the 3D metal-air battery 200 may be the same as described above with reference to FIGS. 1D and 2C.

Hereinafter, the anode 100, the cathode 120 and the ion conducting membrane 110 of the metal-air batteries 200 of FIGS. 1A to 3C will be described in greater detail.

In FIGS. 1A to 3C, the anode 100 of the metal-air battery 200 may be an active metal anode. An active metal of the active metal anode may include at least one selected from an alkali metal (e.g., lithium, sodium, or potassium), an alkali earth metal (e.g., calcium, magnesium, or barium), a certain transition metal (e.g., zinc), and an alloy thereof.

In one embodiment, for example, the active metal of the anode 100 may be at least one selected from lithium and lithium alloys.

In one embodiment, a lithium metal foil as it is may define the anode 100. When a lithium metal foil is used as the active metal, the volume and weight of an anode current collector may be reduced, and thus a lithium-air battery 200 may have improved energy density. In some embodiments, a lithium metal foil as the anode 100 may be disposed on a conductive substrate that may serve as the anode current collector. A metal thin film as the anode 100 may be formed integrated with the anode current collector. The anode current collector may include at least one selected from stainless steel, copper, nickel, iron, and cobalt, but is not limited thereto. Any metallic substrates having high conductivity available in the art may be used as the conductive substrate.

As the active metal of the anode 100, an alloy of a lithium metal and another anode active material may be used. The anode active material of the active metal of the anode 100 may be a metal that is alloyable with lithium. In one embodiment, for example, the metal alloyable with lithium are Si, Sn, Al, Ge, Pb, Bi, Sb, a Si—Y alloy (where Y may be an alkali metal, an alkali earth metal, a Group 13 element, a Group 14 element, a transition metal, a rare-earth element, or a combination thereof, except for Si), and an Sn—Y alloy (where Y may be an alkali metal, an alkali earth metal, a Group 13 element, a Group 14 element, a transition metal, a rare-earth element, or a combination thereof, except for Sn), but not being limited thereto. In one embodiment, for example, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. In one embodiment, for example, an alloy of a lithium metal and another anode active material may be a lithium aluminum alloy, a lithium silicon alloy, a lithium tin alloy, a lithium silver alloy, or a lithium lead alloy.

An active metal anode as the anode 100 may have a thickness in a range of about 10 μm or greater. In one embodiment, for example, the active metal anode may have a thickness in a range of about 10 μm to about 20 μm, and in some embodiments, in a range about 20 μm to about 60 μm, and in some embodiments, in a range about 60 μm to about 100 μm, and in some embodiments, in a range about 100 μm to about 200 μm, and in some embodiments, in a range about 200 μm to about 600 μm, and in some embodiments, in a range about 600 μm to about 1000 μm, and in some other embodiments, in a range about 1 millimeter (mm) to about 6 mm, and in some other embodiments, in a range about 6 mm to about 10 mm, and in some other embodiments, in a range about 10 mm to about 60 mm, and in still other embodiments, in a range about 60 mm to about 100 mm, and in yet other embodiments, in a range about 100 mm to about 600 mm.

As shown in FIGS. 1A to 3C, in an embodiment of the metal-air battery 200, the cathode 120 using oxygen as a cathode active material may include a conductive material. The conductive material may be porous. Accordingly, the cathode active material may be any material having porosity and conductivity, for example, a porous carbonaceous material. In one embodiment, for example, the porous carbonaceous material may be selected from carbon blacks, graphites, graphenes, activated carbons, carbon fibers, and any combinations thereof.

The cathode active material may include a metallic conductive material such as a metal fiber or metal mesh, for example. The cathode active material may be metallic powder, for example, copper, silver, nickel, or aluminum powder. The cathode active material may be an organic conductive material such as polyphenylene derivatives. The above-listed conductive materials may be used alone or in a combination thereof.

A catalyst for facilitating oxygen/reduction of oxygen may be added to the cathode 120. In one embodiment, for example, the catalyst include precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; or organic metal-based catalysts, such as cobalt phthalocyanine, but not being limited thereto. Any appropriate catalysts for oxidation and reduction of oxygen available in the art may be used.

The catalyst may be supported on a support. In one embodiment, for example, the support includes oxide, zeolite, clay mineral or carbon, but not being limited thereto. The oxide may include at least one oxide of alumina, silica, zirconium oxide, and titanium dioxide. The oxide may be an oxide that includes at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). In one embodiment, for example, the carbon include carbon black, such as Ketjen black, acetylene black, channel black, and lamp black; graphite, such as natural graphite, artificial graphite, and expanded graphite; activated carbon; and carbon fibers, but not being limited thereto. Any appropriate materials available as supports in the art may be used.

The cathode 120 may further include a binder. The binder may include a thermoplastic resin or a thermocurable resin. In one embodiment, for example, the binder include polyethylene, polypropylene, polytetrafluoroethylene ("PTFE"), polyvinylidene fluoride ("PVDF"), a styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination, but not being limited thereto. Any appropriate binders available in the art may be used.

The cathode 120 may further include an ion-conductive polymer electrolyte. The ion-conductive polymer electrolyte may have a structure in which at least one polymer selected from polyethylene oxide ("PEO"), polyvinyl alcohol ("PVA"), polyvinylpyrrolidone ("PVP"), and polyvinylsulfone, or a combination thereof is doped with lithium. In one embodiment, for example, the ion-conductive polymer electrolyte may be PEO doped with a lithium salt. The doped lithium salt may be the same as that used in the above-described ion-conductive polymer electrolyte.

The cathode 120 may be manufactured as follows. In one embodiment, for example, a catalyst for oxidation/reduction of oxygen, a conductive material, and a binder may be mixed together, and then an appropriate solvent may be added thereto to prepare a cathode slurry. The cathode slurry may be coated and dried on a surface of a cathode current collector, optionally followed by press-molding to improve the density of the cathode 120, thereby manufacturing the cathode 120. Optionally, the cathode 120 may include a lithium oxide. Optionally, the cathode 120 may not include a catalyst for oxidation/reduction of oxygen.

In an embodiment shown in FIGS. 1A to 3C, the ion conducting membrane 110 may be an active metal ion conducting membrane with the ability to conduct active metal ions.

The ion conducting membrane 110 may be an ion conducting solid membrane. The ion conducting membrane 110 may be substantially impervious, have active metal ion conducting characteristics, and be chemically compatible with an external environment including oxygen or moisture or with a cathode environment.

The ion conducting membrane 110 may have a thickness of about 10 μm or greater. In one embodiment, for example, the ion conducting membrane 110 may have a thickness in a range of about 10 μm to about 20 μm, and in some embodiments, in a range about 20 μm to about 60 μm, and in some embodiments, in a range about 60 μm to about 100 μm, and in some embodiments, in a range about 100 μm to about 200 μm, and in some embodiments, in a range about 200 μm to about 600 μm, and in some embodiments, in a range about 600 μm to about 1000 μm, and in some other embodiments, in a range about 1 mm to about 6 mm, and in some other embodiments, in a range about 6 mm to about 10 mm, and in some other embodiments, in a range about 10 mm to about 60 mm, and in still other embodiments, in a range about 60 mm to about 100 mm, and in yet other embodiments, in a range about 100 mm to about 600 mm.

The ion conducting membrane 110 may be a gas and moisture barrier membrane. In such an embodiment, gas such as oxygen and moisture may be blocked by the active metal ion conducting membrane 110, such that the anode 100 may be effectively prevented from deterioration caused by oxygen or moisture, by hermetically sealing and enclosing the anode 100 with an impervious housing (not shown) including the ion conducting membrane 110.

Although not illustrated, the ion conducting membrane 110 may define a housing that may be substantially impervious and include an internal region that is hermetically sealed from an external region and encloses the anode 100 to be isolated from the cathode 120. In such an embodiment, the housing may isolate the anode 100 from the cathode 120, but may allow transportation of active metal ions into and out of the housing.

In some embodiments, although not illustrated, the housing may further include a seal structure that interfaces with the ion conducting membrane 110 to enclose the anode 100. The seal structure may form the housing that may be substantially impervious and include an internal region that is hermetically sealed from an external region and encloses the anode 100 to be isolated from the cathode 120.

The seal structure may include a polymer having chemical stability, chemical stability, flexibility, and the ability to block gas and moisture.

In one embodiment, for example, the polymer with the ability to block gas and moisture may be polysilicon, polyethylene vinyl alcohol ("EVOH"), polyvinylidene chloride ("PVDC"), high-density polyethylene ("HDPE"), polypropylene, polyvinyl chloride, PTFE, or PVDF, but is not limited thereto. The polymer with the ability to block gas and moisture may be any polymer known to block gas and moisture and be available for a seal structure in the art.

The ion conducting membrane 110 may be a composite membrane including at least two components. The composite membrane may have a thickness in a range of about 10 μm or greater. In one embodiment, for example, the composite membrane may have a thickness in a range of about 10 μm to about 100 μm, and in some embodiments, in a range about 100 μm to about 600 μm.

In one embodiment, for example, the ion conducting membrane 110 may be a composite membrane including an organic film having a plurality of pores and an ion-conductive polymer electrolyte in the plurality of pores of the organic film.

Such an organic film including a plurality of pores may be a porous organic film in which a plurality of pores is disordered. The organic film including a plurality of pores may be a flexible polymer-based separator.

In one embodiment, for example, the porous organic film may be a polymer nonwoven fabric such as polypropylene-based nonwoven fabric, polyimide-based nonwoven fabric, or polyphenylene sulfide-based nonwoven fabric, or a porous film of an olefin-based resin such as polyethylene, polypropylene, polybutene, or polyvinyl chloride, but is not limited thereto. Any materials available for a porous organic layer in the art may be used. In one embodiment, for example, the porous organic layer may include a polymer that is the same as the polymer for an organic layer having a plurality of through holes, as described later. In one embodiment, for example, the porous organic film may be a conventional separator.

The ion-conductive polymer electrolyte may be in the pores of the porous organic film. In one embodiment, for example, the porous organic film including a plurality of pores may be impregnated with the ion-conductive polymer electrolyte.

An ion-conductive polymer electrolyte may be impregnated into a flow path formed by interconnection of the plurality of disordered pores in the porous organic film so as to be exposed to opposite surfaces of the porous organic film to thereby provide a migration path of active metal ions.

The ion-conductive polymer electrolyte may include a polymer, for example, at least one selected from PEO, PVA, PVP and polyvinylsulfone, or a combination thereof. However, the polymer for the ion-conductive polymer electrolyte is not limited thereto. Any polymers available for an ion-conductive polymer electrolyte in the art may be used.

The ion-conductive polymer electrolyte may be PEO doped with a lithium salt. Non-limiting examples of the lithium salt include $LiN(SO_2CF_2CF_3)_2$, $LiBF_4$, $LiPF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

In one embodiment, for example, the ion conducting membrane 110 may be a composite membrane including an organic film having a plurality of through holes and an ion-conductive inorganic particle in the plurality of through holes of the organic film. The term "through hole" refers to a hole that is formed to pass through opposite surfaces of the organic film.

The ion-conductive inorganic particle in the through holes is exposed at both of the opposite surfaces of the organic film, and thus provides a migration path of active metal ions.

The ion conducting membrane 110 may include an ion-conductive domain and a non-ion-conductive domain. The ion-conductive domain and the non-ion-conductive domain may be disposed in a membrane thickness direction (Y-axis direction) to contact each other, thus form a bicontinuous structure. The ion-conductive domain may include an ion-conductive inorganic particle, while the non-ion-conductive domain may include a polymer. The ion-conductive inorganic particle may have a single-particle state without a grain boundary. The ion conducting membrane 110 including ion-conductive inorganic particles that are exposed at the opposite surfaces of the organic film may be a composite membrane having ionic conductivity with improved flexibility and improved mechanical strength, and thus may be processable as desired.

The organic film having a plurality of pores or having a plurality of through holes may include a polymer with the ability to block gas and moisture.

Since the organic film of the ion conducting membrane 110 blocks gas and moisture, the ion conducting membrane 110 may protect the anode 100. Thus, the ion conducting membrane 110 may serve as a protective membrane.

In one embodiment, for example, the polymer with the ability to block gas and moisture may be the same as a polymer used in the above-described seal structure, but is not limited thereto. Any polymer known to have gas and moisture barrier characteristics in the art may be used.

The ion-conductive inorganic particle may be at least one selected from a glassy or amorphous metal ion conductor, a ceramic active metal ion conductor, and a glass ceramic active metal ion conductor, and a combination thereof. The ion-conductive inorganic particle may block gas and moisture.

In one embodiment, for example, the ion-conductive inorganic particle may include at least one selected from $BaTiO_3$, $Pb(Zr,Ti)O_3(PZT)$, $Pb_{1-x}La_xZr_{1-y}Ti_yO_3(PLZT)$ (where $0 \leq x < 1$ and $0 \leq y < 1$), $PB(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(Al, Ga)_x(Ti, Ge)_{2-x}Si_yP_{3-y}O_{12}$ (where $0 \leq x \leq 1$ and $0 \leq y \leq 1$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride-based glass ($Li_xN_y$, where $0<x<4$ and $0<y<2$), $SiS_2$-based glass ($Li_xSi_yS_z$, where $0<x<3$, $0<y<2$, and $0<z<4$), $P_2S_5$-based glass ($Li_xP_yS_z$, where $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$-based ceramics, and Garnet-based ceramics ($Li_{3+x}La_3M_2O_{12}$, where M is Te, Nb, or Zr), or any combinations thereof. However, the ion-conductive inorganic particle is not limited thereto, and may include any materials known to be available as ion-conductive inorganic particles in the art.

The ion-conductive inorganic particle has no grain boundary, as described above. Accordingly, a composite membrane including such ion-conductive inorganic particles may have a low-resistance conduction path of active metal ions. This may facilitate conduction and migration of active metal ions and consequentially, significantly improve the conductivity of active metal ions and the transport rate of lithium ions. The composite membrane may have improved flexibility and improved mechanical strength, compared to a membrane including only inorganic particles.

The fact that the ion-conductive inorganic particle is in a single-particle state without a grain boundary may be identified using scanning electron microscopy ("SEM").

In one embodiment, for example, the ion-conductive inorganic particle may have an average particle diameter in a range of about 10 μm to about 300 μm, and in some embodiments, in a range about 90 μm to about 125 μm. When the average particle diameter of the ion-conductive inorganic particle is within these ranges, the active metal ion conducting membrane architecture 200 may be effectively formed as a composite membrane including ion-conductive inorganic particles having a single-particle state without a grain boundary, for example, by polishing.

The ion-conductive inorganic particle may have a uniform particle size, and may maintain the particle size uniform in the composite membrane. In one embodiment, for example, the ion-conductive inorganic particle may have a D50 of about 110 μm to about 130 μm, a D90 of about 180 μm to about 200 μm, and a D10 of about 60 μm to about 80 μm. The terms "D50", "D10", and "D90" refer to a particle diameter of 50 volume %, 10 volume %, and 90 volume %, respectively, in a cumulative distribution curve of particle sizes.

The ion conducting membrane 110 may have a single-layer structure or a multi-layer structure.

In an embodiment, where the ion conducting membrane 110 is a composite membrane having a single-layer structure, the composite membrane may include a separator having a plurality of pores and an ion-conductive polymer electrolyte in the pores of the separator, or may include an organic film having a plurality of through holes and an ion-conductive inorganic particle in the through holes of the organic film. Such composite membranes may be prepared at a lower cost than conventional ceramic material membranes. A metal-air battery with a larger area, a thin film design, and a less weight may be manufactured using such a composite membrane through a convenient manufacturing process. A metal-air battery with improved lifetime may be manufactured using such a composite membrane. In one embodiment, for example, the composite membrane having a single-layer structure may have a thickness in a range of about 10 μm to about 100 μm, and in some embodiments, in a range of about 100 μm to about 300 μm.

In an embodiment, where the ion conducting membrane 110 is a composite membrane having a multi-layer structure, the ion conducting membrane 110 may have a multi-layer structure in which a composite layer as a gas and moisture barrier membrane and a polymer electrolyte membrane are stacked upon one another. The further inclusion of the polymer electrolyte membrane between the composite layer and the anode 100, which is chemically compatible with both anode environments and the composite layer, may improve the stability of the anode 100 and the composite layer. The composite layer may serve substantially as a protective membrane for the anode 100.

The polymer electrolyte membrane disposed between the composite layer and the anode 100 may have a thickness in a range of about 10 μm or greater. In one embodiment, for example, the polymer electrolyte membrane may have a thickness in a range of about 10 μm to about 100 μm, and in some embodiments, in a range of about 100 μm to about 300 μm. In one embodiment, for example, the polymer electrolyte membrane may include a PEO doped with a lithium salt. Examples of the doped lithium salt may be the same as those listed above in conjunction with the ion-conductive polymer electrolyte.

In some other embodiments, a porous layer may be further disposed between the composite membrane and the polymer electrolyte membrane, or between the polymer electrolyte membrane and the anode 100.

The porous layer may be any layer including pores and having good mechanical and heat-resistance characteristics. In one embodiment, for example, the porous layer is a sheet or a nonwoven fabric including or made of an olefin-based polymer, glass fiber, or polyethylene having good chemical resistance and hydrophobic characteristics. In one embodiment, for example, the olefin-based polymer may be polyethylene, polypropylene, or any combinations thereof. In one embodiment, for example, the porous membrane may be a mixed multiple layer, such as a 2-layered polyethylene/polypropylene separator, a 3-layered polyethylene/polypropylene/polyethylene separator, or a 3-layered polypropylene/polyethylene/polypropylene separator.

In one embodiment, for example, the porous layer may be a polyethylene layer, a polypropylene layer, or a combination thereof. The porous layer may have a pore diameter in a range of about 0.01 μm to about 10 μm, and a thickness in a range of about 10 μm or greater. In one embodiment, for example, the porous membrane may have a thickness in a range of about 10 μm to about 100 μm, and in some embodiments, in a range of about 100 μm to about 300 μm. In one embodiment, for example, the porous layer may have a thickness in a range of about 10 μm to about 50 μm.

The porous layer may include an electrolyte solution including a lithium salt and an organic solvent. The porous layer including an electrolyte solution may serve as an electrolyte membrane.

The amount of the lithium salt may be adjusted to be about 0.01M to about 5M, for example, about 0.2M to about 2M. When the amount of the lithium salt is within such a range described above, the porous layer may have good conductivity.

The lithium salt may be dissolved in an organic solvent to serve as a source of lithium ions. In one embodiment, for example, the lithium salt may be at least one selected from $LiPF_6$, $LiBF_4$, $LiSbF_8$, $LiAsF_6$, $LiN(SO_2C_2F_5)_2$, $Li(CF_3SO_2)_2N(LiTFSi)$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI, $LiB(C_2O_4)_2$ (lithium bis(oxalato) borate, LiBOB), and $LiN(SO_2F)_2$ (LIFSi).

The electrolyte solution in the porous layer may further include a metal salt, for example, $AlCl_3$, $MgCl_2$, NaCl, KCl, NaBr, KBr, or $CaCl_2$, in addition to a lithium salt as described above.

In one embodiment, for example, the organic solvent of the electrolyte solution may be an aprotic solvent. In one embodiment, for example, the aprotic solvent may be a carbonate-based solvent, an ester-based solvent, an ether-based solvent, a ketone-based solvent, an amine-based solvent, or a phosphine-based solvent, but not being limited thereto.

In one embodiment, such a carbonate-based solvents may be dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), or butylene carbonate ("BC"), but not being limited thereto.

In one embodiment, for example, such an ester-based solvent may be methyl acetate, ethyl acetate, n-propyl acetate, dimethyl acetate, methyl propionate, ethyl propionate, γ-butyrolactone, decanolide, valerolactone, mevalonolactone, or caprolactone.

In one embodiment, for example, such an ether-based solvent may be dibutyl ether, tetraglyme, diglyme, dimethoxyethane, 2-methyl tetrahydrofuran, or tetrahydrofuran. In one embodiment, for example, such a ketone-based solvents include cyclohexanone.

In one embodiment, for example, such an amine-based solvents may be triethylamine or triphenylamine. In one embodiment, for example, such a phosphine-based solvent include triethylphosphine. In an embodiment, the aprotic solvents are not limited to the above-listed solvents. Any aprotic solvents available in the art may be used In one embodiment, for example, the aprotic solvent may be nitriles such as R—CN (where R is a linear, branched, or cyclic C2-C30 hydrocarbon group that may include a double bond, an aromatic ring, or an ether bond); amines such as dimethylformamide; dioxolanes such as 1,3-dioxolane; or sulfolanes.

The above-listed aprotic solvents may be used alone or in a combination of at least one thereof. When the above-listed aprotic solvents are used in a combination of at least one thereof, a mixing ratio of the at least one aprotic solvents may be appropriately adjusted depending on a desired performance of the battery.

In some embodiments, the porous layer may include an ionic liquid. In one embodiment, for example, such an ionic liquid may be compounds including cations of linear or branched substituted ammonium, imidazolium, pyrrolidinium pyridinium, or piperidinium; and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

In an embodiment, although not illustrated, a solid electrolyte membrane may be further disclosed between the cathode 120 and the ion conducting membrane 110. The additional solid electrolyte membrane may be a polymer electrolyte membrane or an inorganic electrolyte membrane.

In an embodiment, although not illustrated, a porous layer may be further disposed between the cathode 120 and the ion conducting membrane 110. In such an embodiment, the porous layer between the cathode 120 and the ion conducting membrane 110 may be the same as those of the porous layer disposed between the composite membrane and the polymer electrolyte membrane, or between the polymer electrolyte membrane and the anode 100.

In an embodiment, although not illustrated, a separator may be further disposed between the cathode 120 and the anode 100. The separator may be any separator having a composition that is suitable for use in a metal-air battery. In one embodiment, for example, the separator may be a polymeric non-woven fabric such as polypropylene non-woven fabric or polyphenylene sulfide non-woven fabric; a porous film of an olefin-based resin such as polyethylene or polypropylene; or a combination of at least two thereof.

Figure 4A:
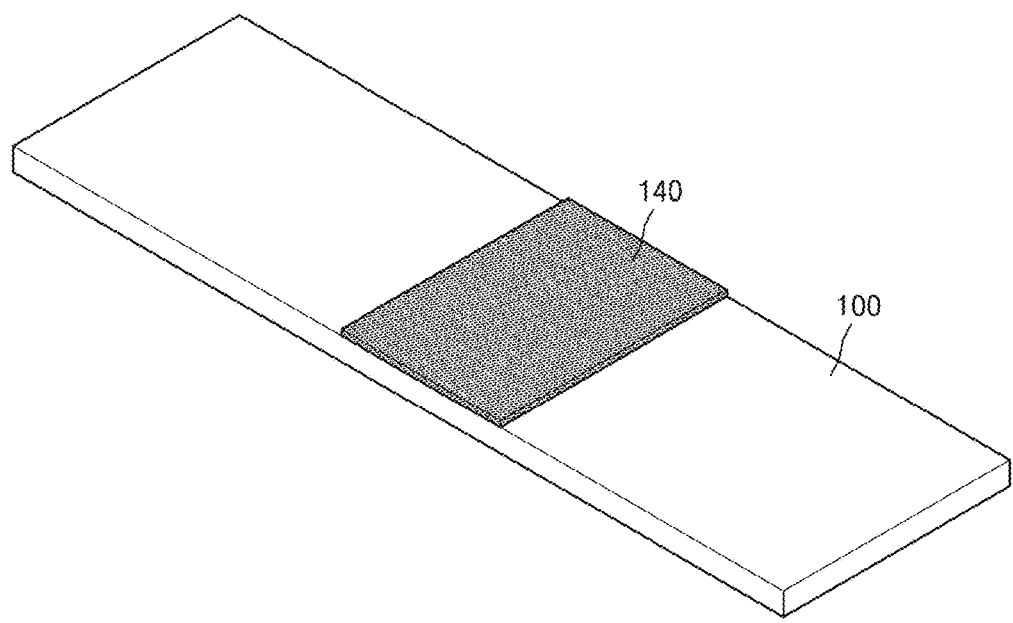
FIGS. 4A to 4C are schematic views showing an embodiment of a method of manufacturing a metal-air battery, according to the invention.
Figure 4B:
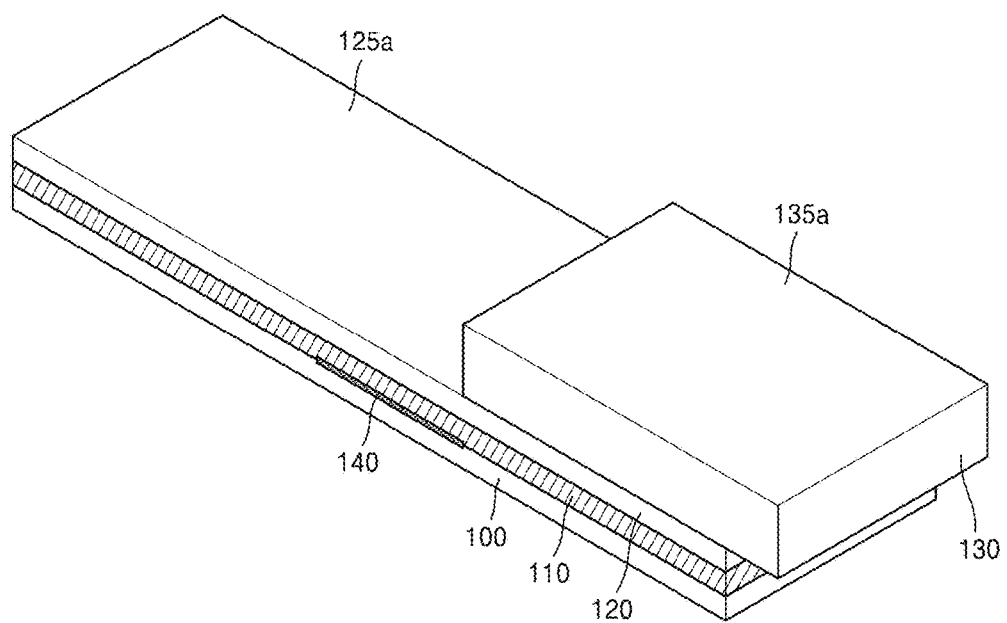
Figure 4C:
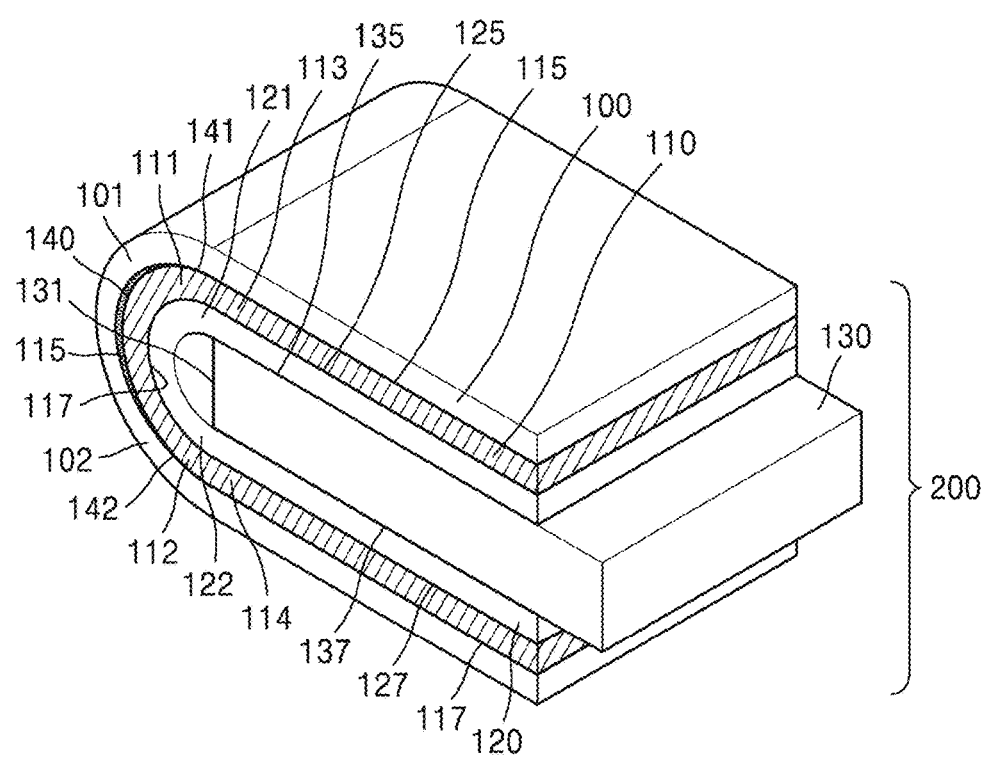

FIGS. 4A to 4C are schematic views showing an embodiment of a method of manufacturing a metal-air battery, according to the invention.

Referring to FIGS. 4A to 4C, an embodiment of a method of manufacturing a metal-air battery may include: providing an anode 100; providing an interlayer 140 including a reinforcing agent in a region of a surface of the anode 100 (see FIG. 4A); providing an ion conducting membrane 110 on the surface of the anode 100 on which the interlayer 140 is disposed; providing cathode 120 on a surface of the ion conducting membrane 110; providing a gas diffusion layer 130 in a region of a surface of the cathode 120 (see FIG. 4B); and folding the cathode 120, the ion conducting membrane 110 and the anode 100 at least one time to contact a surface 125a of the cathode 120 that is exposed and to which the gas diffusion layer 130 is not provided, and a surface 135a of the gas diffusion layer 130 (see FIG. 4C).

The metal-air battery may prevent cracking of the ion conducting membrane 110, which may likely occur in the folding step, and a short between the cathode 120 and the anode 100 by the inclusion of the interlayer 140 including a reinforcing agent.

Such an embodiment of a metal-air battery described herein may be available either as a lithium primary battery or a lithium secondary battery. The metal-air battery may have any of various shapes, and in some embodiments, may have a shape like a coin, a button, a sheet, a stack, a cylinder, a plane, or a horn. The metal-air battery may be applicable as a large battery, for example, for a battery for an electric vehicle.

The term "air" used herein is not limited to atmospheric air, and for convenience, may refer to a combination of gases including oxygen, or pure oxygen gas. This broad definition of "air" may also apply to other terms, including "air battery" and "air electrode".

One or more embodiments of the disclosure will now be described in detail with reference to the following examples. However, these examples are only for illustrative purposes and are not intended to limit the scope of the one or more embodiments of the disclosure.

Manufacture of Lithium-Air Battery

Example 1: Lithium-Air Battery Including Reinforcing Agent (Manufacture of Cathode)

16.32 g of PEO (Mw=600,000, available from Aldrich, 182028) was dissolved in 150 mL of acetonitrile to obtain a PEO solution. Then, LiTFSi was added to the PEO solution to reach a ratio of [EO] to [Li] of 18:1 by mole, and then stirred. The resulting solution was cast on a Teflon dish, dried at room temperature in a drying chamber for 2 days, and then further dried in a vacuum at about 80° C. overnight to remove the acetonitrile solvent, thereby obtaining a cathode electrolyte film.

Carbon black (Printex®, available from Orion Engineered Chemicals, USA) was dried in a vacuum at about 120° C. for about 24 hours.

The carbon black, PTFE as a binder, and propylene glycol were weighed in a predetermined weight ratio, mechanically kneaded together, and then roll-pressed to form a cathode having a thickness of about 30 μm, followed by drying in an oven at about 60° C. and cutting into a rectangular cathode (2 cm×3 cm) having an area of about 6 cm². The cathode electrolyte film prepared as described above was then placed on the cathode, and hot-pressed at about 120° C. to impregnate electrolyte into the cathode. A weight ratio of the carbon black to gel electrolyte in the cathode impregnated with electrolyte was about 1:2.5, and a weight ratio of the carbon black to the binder was about 1:0.2. The cathode impregnated with electrolyte had a weight of about 3 mg/cm².

(Manufacture of Electrolyte Membrane)

A porous separator (Celgard®) was impregnated with the same solution as used to form the cathode electrolyte film, dried at room temperature in a drying chamber for 2 days, and then further vacuum-dried in an oven at about 120° C. overnight to remove the solvent, thereby obtaining a solid electrolyte membrane. The solid electrolyte membrane had a thickness of about 70 μm to about 90 μm.

(Manufacture of Lithium-Air Battery)

A lithium metal (2.4 cm×3.4 cm) having a thickness of about 30 μm was disposed on an anode current collector (2.4 cm×3.4 cm), and then the electrolyte membrane (2.2 cm×3.2 cm) was disposed on the lithium metal.

0.04 μg of a silicon-based silant (Shin-Etsu Chemical Co. Ltd., Lot No.: 003276) as a reinforcing agent was coated in the middle of a surface of the electrolyte membrane to form an interlayer having a thickness of about 10 μm, a width of about 100 μm, and a length of about 3 cm. The cathode (2 cm×3 cm) was then disposed on the surface of the electrolyte membrane on which the interlayer was disposed, and a gas diffusion layer (1.5 cm×3 cm) was disposed on one half of a surface of the cathode.

Subsequently, the cathode, the electrolyte membrane, the lithium metal, and the anode current collector were folded by about 180° to contact the other half of the surface of the cathode, which is not covered by the gas diffusion layer, with a surface of the gas diffusion layer, thereby manufacturing a lithium-air battery.

The lithium-air battery had the same structure as the metal-air battery of FIG. 2B, although an anode current collector is not illustrated in FIG. 2B. Air is supplied into the lithium-air battery through sides of the gas diffusion layer.

Example 2: Lithium-Air Battery Including Separate Cathodes and Reinforcing Agent (Manufacture of Cathode)

Two separate cathodes were manufactured in the same manner as in Example 1.

(Manufacture of Electrolyte Membrane)

An electrolyte membrane was manufactured in the same manner as in Example 1.

(Manufacture of Lithium-Air Battery)

A lithium metal (2.4 cm×3.4 cm) having a thickness of about 30 μm was disposed on an anode current collector (2.4 cm×3.4 cm), and then the electrolyte membrane (2.2 cm×3.2 cm) was disposed on the lithium metal.

0.04 μg of a silicon-based silant (Shin-Etsu Chemical Co. Ltd., Lot No.: 003276) as a reinforcing agent was coated in the middle of a surface of the electrolyte membrane to form an interlayer having a thickness of about 10 μm, a width of about 100 μm, and a length of about 3 cm. A first cathode (1 cm×3 cm) was then disposed on one half of the surface of the electrolyte membrane in which the interlayer was disposed to contact an edge of the interlayer, and the gas diffusion layer (1.5 cm×3 cm) was disposed on the first cathode. A second cathode (1 cm×3 cm) was then disposed on the gas diffusion layer.

Subsequently, the electrolyte membrane, the lithium metal, and the anode current collector were folded by about 180° to contact the other half of the surface of the cathode, which is not covered by a stack of the first cathode/the gas diffusion layer/the second cathode with a surface of the second cathode, thereby manufacturing a lithium-air battery.

The lithium-air battery had the same structure as the metal-air battery of FIG. 1C, although an anode current collector is not illustrated in FIG. 1C. Air is supplied into the lithium-air battery through sides of the gas diffusion layer.

Comparative Example 1: Manufacture of Lithium-Air Battery

A lithium-air battery was manufactured in the same manner as in Example 1, except that a reinforcing agent was not coated.

Evaluation Example 1: Evaluation of Charge-Discharge Characteristics

Figure 5A:
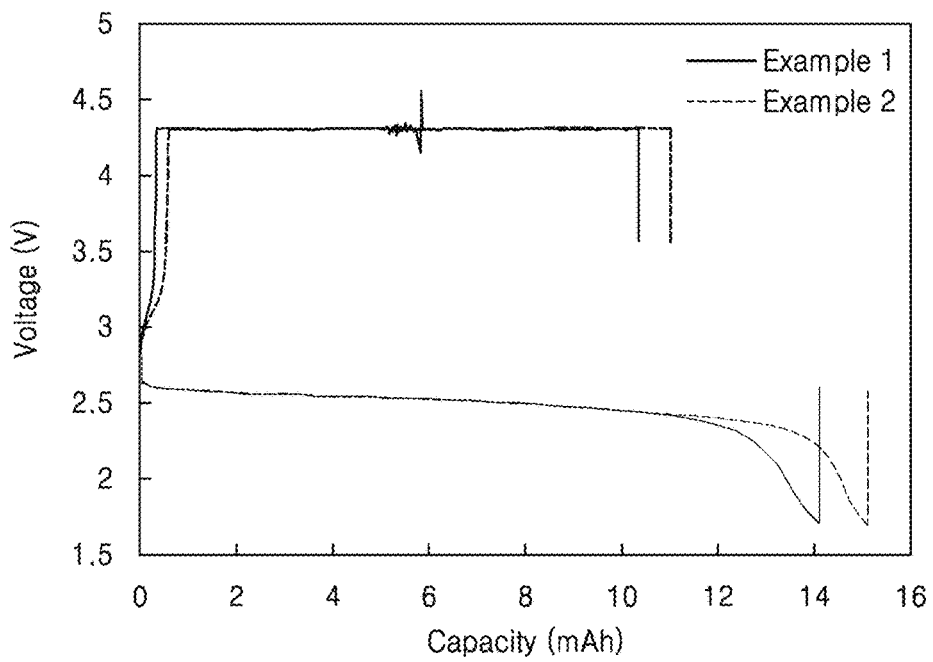
FIG. 5A illustrates charge-discharge curves of embodiments of a lithium-air battery.
Figure 5B:
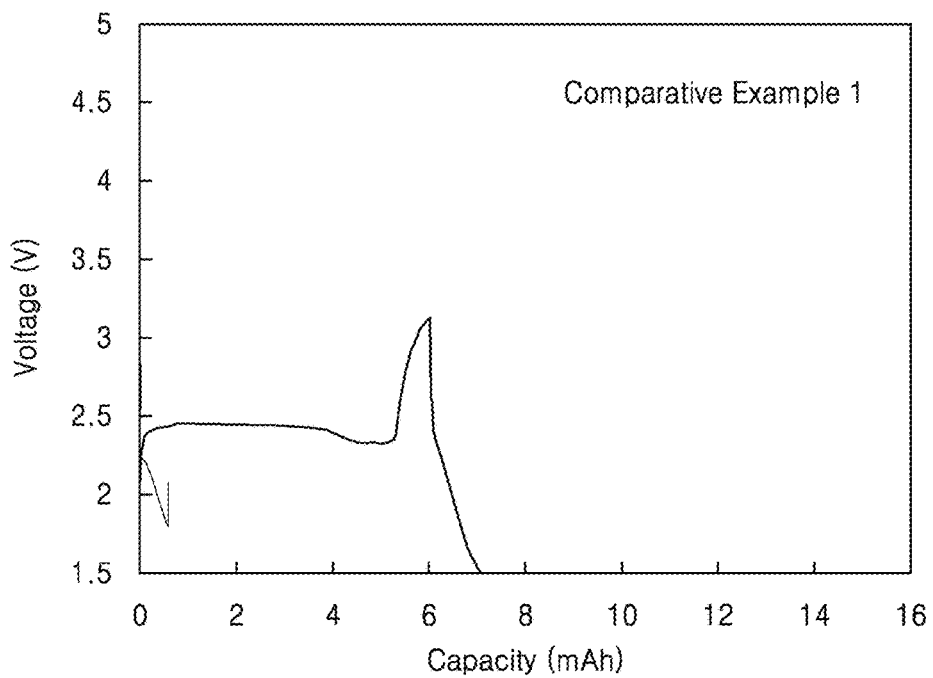
FIG. 5B illustrates a charge-discharge curve of a comparative embodiment of a lithium-air battery.

FIG. 5A illustrates charge-discharge curves of embodiments of a lithium-air battery (Examples 1 and 2); and FIG. 5B illustrates a charge-discharge curve of a comparative embodiment of a lithium-air battery (Comparative Example 1).

The lithium-air batteries of Examples 1 and 2 and Comparative Example 1 were each subjected to one charge/discharge cycle at about 60° C. under 1-atm oxygen atmosphere with a constant current of about 0.24 mA/cm² in a voltage range of about 1.7 V to about 4.2 V (with respect to Li). Charge/discharge profiles of the lithium-air batteries at one charge/discharge cycle are shown in FIGS. 5A and 5B.

Referring to FIG. 5A, the lithium-air batteries of Examples 1 and 2 were found to have a normal charge-discharge profile. However, a normal charge-discharge profile was not obtained with the lithium-air battery of Comparative Example 1, as shown in FIG. 5B, since a short occurred in the lithium-air battery of Comparative Example 1 due to cracks in the electrolyte membrane.

As described above, according to embodiments set forth herein, a metal-air battery may include a cathode(s) or an anode that is not disposed at a folded portion of the metal-air battery or may include a interlayer including a reinforce agent at the folded portion, and thus may have improved stability.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal-air battery comprising:
a gas diffusion layer;
a first cathode and a second cathode spaced apart from each other, using oxygen as a cathode active material and disposed on opposite surfaces of the gas diffusion layer, respectively;
an ion conducting membrane surrounding the first cathode, the gas diffusion layer and the second cathode and disposed on each of the first cathode and the second cathode, wherein the ion conducting membrane comprises a folded portion, which is folded by about 180° and not contacting the gas diffusion layer, the first cathode and the second cathode; and
an anode surrounding the ion conducting membrane and disposed on the ion conducting membrane, wherein the anode comprises a folded portion, which is folded by about 180°,
wherein the folded portion of the anode is folded in a same direction as the folded portion of the ion conducting membrane.

2. The metal-air battery of claim 1, further comprising:
an interlayer comprising a reinforcing agent, wherein the interlayer contacts the folded portion of the ion conducting membrane.

3. The metal-air battery of claim 2, wherein the interlayer comprises a coating layer disposed on the folded portion of the ion conducting membrane.

4. The metal-air battery of claim 2, wherein the interlayer is disposed between the folded portion of the ion conducting membrane and the folded portion of the anode.

5. The metal-air battery of claim 2, wherein the interlayer is disposed on an inner surface of the folded portion of the ion conducting membrane, which faces the gas diffusion layer.

6. The metal-air battery of claim 1, wherein the metal-air battery comprises:
a plurality of gas diffusion layers spaced apart from one another in a thickness direction of the metal-air battery
wherein the first cathode and the second cathode are disposed on opposite surfaces of each of the gas diffusion layers, respectively,
wherein the ion conducting membrane is repeatedly folded by about 180° to allow a first surface thereof to contact the first and second cathodes on each of the gas diffusion layers,
the anode is repeatedly folded by about 180° in a same pattern as the ion conducting membrane, to contact a second surface of the ion conducting membrane, which is opposite to the second surface of the ion conducting membrane, and
the anode further comprises a portion folded by 180° and disposed between two adjacent gas diffusion layers.

7. The metal-air battery of claim 6, further comprising:
an interlayer comprising a reinforcing agent,
wherein the interlayer contacts the folded portion of the ion conducting membrane.

8. The metal-air battery of claim 2, wherein the interlayer has a thickness in a range of about 5 µm to about 500 µm.

9. The metal-air battery of claim 3, wherein a width between end portions of the interlayer is in a range of about 10 µm to about 1000 µm.

10. The metal-air battery of claim 2, wherein the reinforcing agent comprises an elastic polymer.

11. The metal-air battery of claim 2, wherein the reinforcing agent comprises at least one selected from a polysiloxane resin, a phenoxy resin, a polyester resin, a polyurethane resin, a polyimide resin, a polysulfide resin, a siloxane-modified polyimide resin, polybutadiene, polypropylene, an isobutylene-isoprene copolymer, a styrene-butadiene-styrene copolymer, a styrene-ethylene-butylene-styrene copolymer, a polyacetal resin, a polyvinyl butyral resin, a polyvinyl acetal resin, polyamide resin, an acrylonitrile-butadiene copolymer, an acrylonitrile-butadiene-acrylic acid copolymer, an acrylonitrile-butadiene-styrene copolymer, polyvinyl acetate, nylon, a (meth)acrylic resin, (meth)acrylic rubber, an urethane (meth)acrylate copolymer, an acryl copolymer, and a modified polymer thereof.

12. The metal-air battery of claim 1, wherein the ion conducting membrane comprises a gas and moisture barrier membrane.

13. A metal-air membrane comprising:
a gas diffusion layer;
a cathode surrounding the gas diffusion layer and disposed on each of opposite surfaces of the gas diffusion layer, wherein the cathode comprises a folded portion, which is folded by about 180° and not contacting the gas diffusion layer;
an ion conducting membrane surrounding the cathode and disposed on opposite surfaces of the cathode, wherein the ion conducting membrane comprise a folded portion, which is folded by about 180° in a same direction as the folded portion of the cathode;
an anode surrounding the ion conducting membrane and disposed on opposite surfaces of the ion conducting membrane, wherein the anode comprises a folded portion, which is folded by about 180° in a same direction as the folded portion of the ion conducting membrane; and
an impervious seal structure interfacing with the ion conducting membrane to enclose the anode;
an interlayer comprising a reinforcing agent, wherein the interlayer is disposed to contact the folded portion of the ion conducting membrane and not to contact the gas diffusion layer,
wherein the reinforcing agent comprises a sealant which prevents a crack of the ion conducting membrane.

14. The metal-air battery of claim 13, wherein the interlayer is disposed between the folded portion of the ion conducting membrane and the folded portion of the anode.

15. The metal-air battery of claim 13, wherein the interlayer is disposed between the folded portion of the ion conducting membrane and the folded portion of the cathode.

16. The metal-air battery of claim 13, wherein the metal-air battery comprises:
a plurality of gas diffusion layers spaced apart from one another in a thickness direction of the metal-air battery,
wherein the cathode is repeatedly folded by about 180° to allow a first surface thereof to contact opposite surfaces of each of the gas diffusion layers,
the ion conducting membrane is repeatedly folded by 180° in a same pattern as the cathode, to contact a second surface of the cathode, which is opposite to the first surface of the cathode
the anode is repeatedly folded by about 180° in a same pattern as the ion conducting membrane, to contact the ion conducting membrane, and
the anode further comprises a portion folded by about 180° and between two adjacent gas diffusion layers.

17. A metal-air battery comprising:
a gas diffusion layer;
a cathode surrounding the gas diffusion layer and disposed on opposite surfaces of the gas diffusion layer, wherein the cathode comprises a folded portion which is folded by about 180°;
an ion conducting membrane surrounding the cathode and disposed on opposite surfaces of the cathode, wherein the ion conducting membrane comprises a folded portion, which is folded by about 180° in a same direction as the folded portion of the cathode; and
a first anode and a second anode, which are spaced apart from each other, disposed on opposite surfaces of the gas diffusion layer, respectively, and not contacting the folded portion of the ion conducting membrane; and
an anode current collector surrounding the first anode, the ion conducting membrane and the second anode, and disposed on outer surfaces of the first anode and the second anode, wherein the anode current collector comprises a folded portion, which is folded by about 180°,
wherein the anode current collector contacts the ion conducting membrane in the folded portion of the ion conducting membrane.

18. The metal-air battery of claim 17, further comprising:
an interlayer comprising a reinforcing agent, wherein the interlayer contacts the folded portion of the ion conducting membrane.

19. The metal-air battery of claim 18, wherein the interlayer is disposed between the folded portion of the ion conducting membrane and the folded portion of the anode current collector.

20. The metal-air battery of claim 18, wherein the interlayer is disposed between the folded portion of the ion conducting membrane and the folded portion of the cathode.

* * * * *